United States Patent
Morris et al.

(10) Patent No.: US 7,825,191 B2
(45) Date of Patent: Nov. 2, 2010

(54) COMPOSITION COMPRISING AN IONOMER AND POTASSIUM IONS

(75) Inventors: Barry Alan Morris, Wilmington, DE (US); Karlheinz Hausmann, Auvernier (CH); Matthew Scott Hall, Landenberg, PA (US); John Chu Chen, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 809 days.

(21) Appl. No.: 11/642,072

(22) Filed: Dec. 20, 2006

(65) Prior Publication Data

US 2007/0142542 A1 Jun. 21, 2007

Related U.S. Application Data

(60) Provisional application No. 60/751,814, filed on Dec. 20, 2005.

(51) Int. Cl.
*C08L 33/02* (2006.01)

(52) U.S. Cl. .................. 525/221; 524/556; 526/319

(58) Field of Classification Search .............. 526/319; 524/556; 525/221
See application file for complete search history.

(56) References Cited

U.S. PATENT DOCUMENTS

| 5,763,062 | A | * | 6/1998 | Smith et al. ............... 428/215 |
|---|---|---|---|---|
| 6,808,772 | B2 | | 10/2004 | Kunzel |
| 6,890,666 | B2 | | 5/2005 | Kunzel |
| 2002/0013421 | A1 | * | 1/2002 | Takesue et al. ............ 525/418 |
| 2003/0004012 | A1 | | 1/2003 | Kennedy, III et al. |
| 2004/0072629 | A1 | | 4/2004 | Keller et al. |
| 2004/0092335 | A1 | * | 5/2004 | Boehm et al. ............. 473/354 |
| 2004/0103604 | A1 | | 6/2004 | Kunzel |
| 2004/0245391 | A1 | | 12/2004 | Kunzel |
| 2005/0256268 | A1 | * | 11/2005 | Chen ........................ 525/221 |

FOREIGN PATENT DOCUMENTS

JP 2004169006 A * 6/2004

OTHER PUBLICATIONS

DuPont® Entira AS polymer modifier; Internet Publication May 2006.
DuPont announces Entira AS anti-static additive for thermoplastic resins; Internet Publication May 10, 2006.
PCT International Search Report for International application No. PCT/US2006/048586, dated May 14, 2007.

* cited by examiner

*Primary Examiner*—David Wu
*Assistant Examiner*—Michael M Bernshteyn

(57) ABSTRACT

A composition and an article comprising or produced from the composition are disclosed. The composition comprises an ionomer and a reducing static charge-buildup amount of potassium ion wherein the ionomer is neutralized with sodium, zinc, or magnesium ions. The article can be a film including a multilayer film.

20 Claims, No Drawings

COMPOSITION COMPRISING AN IONOMER AND POTASSIUM IONS

This application claims priority to U.S. provisional application Ser. No. 60/751,814, filed Dec. 20, 2005, the entire disclosure of which is incorporated herein by reference.

The invention relates to a composition comprising an ionomer and potassium ions, a process therefor, and a product or process therewith.

BACKGROUND OF THE INVENTION

An ionomer such as Surlyn® which is readily available commercially from E. I. du Pont de Nemours and Company, Wilmington, Del., USA (DuPont), has been used in packaging applications for many years for its heat seal properties and toughness in flexible packaging. It is used in cosmetics packaging for aesthetics such as perfume caps, bottles, or cases. An ionomer is also used to replace PVC in flooring. Ionomers are generally produced by neutralization of ethylene acid copolymers with zinc or sodium metal ions. Such ionomers may have a tendency to pick-up a static charge, more so than alternative materials such as polyethylene. The static charge attracts dust, negatively affecting the appearance of cosmetics packaging and causing contamination of the seal area in flexible packaging thereby affecting the use of such ionomers in the packaging of powdered foods (such as cake mixes, powdered drinks, and shredded cheese) due to the static nature of Surlyn®. Dust accumulation can detract from the appearance of the packages. By reducing the tendency of an ionomer to attract dust, one can grow the use of ionomer in packaging market.

Surface resistivities (for electric current flowing across a surface as the ratio of the DC voltage drop per unit length to the surface current per unit length) covering the range from highly conductive materials to insulators include highly conductive: $10^{-6}$ to 10 Ohms/square; conductive: $10^2$ to $10^4$ Ohms/sq; dissipative: $10^4$ to $10^{11}$ Ohms/sq; and insulating: $10^{11}$ to $10^{16}$ Ohms/sq.

Ionomers made with potassium ions exhibit antistatic properties for they reduce the surface resistivity and static decay times of the polymer so that they may be suited for demanding applications such as the packaging of electronic components.

Antistatic resins, such as a highly neutralized potassium ionomers MK400, available from DuPont-Mitsui (MDP), Tokyo, Japan, have surface resistivities of about $10^8$ to $10^{11}$ Ohms/sq. Antistatic resins may have poor mechanical properties, poor thermal instabilities, etc. For example, highly neutralized potassium ionomers may be susceptible to moisture pick-up, which affects its physical properties. In potassium neutralized ionomers, very high levels of potassium ions (as high as 70% neutralized) are needed to achieve such properties.

It is therefore desirable to develop a new ionomer composition that does not require such high potassium neutralization but capable of reducing the ionomer's tendency to build up charges.

SUMMARY OF THE INVENTION

A composition comprises an ionomer and a static charge-buildup reduction amount of potassium ion wherein the ionomer has the carboxylic acid or a portion thereof in corresponding acid copolymer neutralized with sodium ions, zinc ions, magnesium ions, or combinations of two of more thereof.

A process for producing comprises contacting a static charge-buildup reduction amount of potassium ion with an ionomer wherein the ionomer can be the same as that disclosed above.

An article comprises or produced from a composition which can be the same as the composition disclosed above and the article can be a film including a multilayer film, which can be converted to a shaped article.

DETAILED DESCRIPTION OF THE INVENTION

An ionomer can be produced by any means known to one skilled in the art by neutralization of an ethylene acid copolymer with one or more metal ions. An ethylene acid copolymer is a polymer that can comprise repeat units derived from ethylene and about 1 to about 50%, or about 5 to about 40%, or 10 to 25%, by weight of a comonomer such as acrylic acid, methacrylic acid, ethacrylic acid, or combinations of two or more thereof, based on the total weight of the ethylene copolymer. Ionomer is well known to one skilled in the art (see e.g., U.S. Pat. No. 3,264,272) and the description of which is omitted for the interest of brevity.

An ethylene acid copolymer may comprise up to 35 wt % of an optional comonomer such as carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, or combinations of two or more thereof where the alky group can be linear or branched.

The neutralization, for example, can range from about 0.1 to about 100, or about 10 to about 90, or about 20 to about 80, or about 20 to about 40 percent, based on the total carboxylic acid content, with a metallic ion. The metallic ions can be monovalent, divalent, trivalent, multivalent, or combinations of two or more thereof. Examples include Li, Na, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Frequently used ions include Na, Zn, or combinations thereof. Of interest here is an ionomer that is neutralized with sodium or zinc ions such as NaOH, $NaHCO_3$, $Na_2CO_3$, $NaHSO_4$, $NaH_2PO_4$, $Na_2HPO_3$, sodium stearate, sodium oleate, sodium salicylate, sodium phenolate, $Zn(OH)_2$, $ZnCO_3$, $ZnCO_3$, $ZnSO_4$, $ZnHPO_4$, $ZnHPO_3$, zinc oxide, zinc stearate, zinc oleate, zinc salicylate, zinc phenolate, $Mg(OH)_2$, $MgCO_3$, $MgCO_3$, $MgSO_4$, $MgHPO_4$, $MgHPO_3$, magnesium stearate, magnesium oleate, magnesium salicylate, magnesium phenolate, or combinations of two or more thereof.

The ionomer can be a blend of an ionomer having a greater than 20% neutralization and, for example, a second ethylene acid copolymer to achieve the desired degree of neutralization. For example, the ionomer can comprise about 1 to about 50, about 5 to about 40, or about 10 to about 25 weight % of an acid copolymer disclosed above.

The ionomer can also be a blend of an ionomer and about 1 to about 50 weight % of an ethylene alkyl(meth)acrylate copolymer. Examples of such alkyl(meth)acrylate include methyl acrylate, ethyl acrylate, methyl methacrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, 2-hydroxyethyl acrylate, 2-hydroxyethyl methacrylate, glycidyl acrylate, glycidyl methacrylate, as well as one or more of those alkylacrylates disclosed above, or combinations of two or more thereof.

For example, an ethylene alkyl acrylate copolymer can comprise from 1 to 30 weight % of at least one E/X/Y copolymer wherein E comprises ethylene; X is a monomer selected from the group consisting of vinyl acetate and alkyl(meth) acrylic esters; and Y is one or more optional comonomers disclosed above; X is from 0 to 50 weight % of the E/X/Y copolymer, Y is from 0 to 35 weight % of the E/X/Y copolymer, wherein the weight % of X and Y cannot both be 0, and E being the remainder.

The ionomer can also be a blend of the ionomer and a copolymer comprising repeat units derived from ethylene, about 4 to about 30 weight % of a vinyl alkanoate or an ester including alkyl(meth) acrylate, and about 0.5 to about 20 weight % of an unsaturated monocarboxylic acid including (meth)acrylic acid. Such copolymers include ethylene acrylate copolymer comprising copolymer having repeat units derived from ethylene, vinyl acetate, and methacrylic acid or from ethylene, alkyl acrylate, and acrylic acid. See, e.g., U.S. Pat. No. 4,346,196 and U.S. Pat. No. 4,469,754 (entire disclosures are incorporated herein by reference).

Examples of commercially available ethylene acid copolymer includes Nucrel®; ionomer includes Surlyn® disclosed above; ethylene copolymer includes Appeel® and Elvaloy®, all from DuPont.

The processes for producing an ethylene acid copolymer and ethylene alkylacrylate copolymer are well known to one skilled in the art and the description of which is omitted herein for the interest of brevity.

A sodium-, magnesium-, or zinc-neutralized ionomer can have about 5 to about 90, or about 10 to about 70, or about 15 to about 60, % of the carboxylic acid in the ionomer's corresponding acid copolymer neutralized. A commercially available sodium-neutralized ionomer is Surlyn® 1601 from DuPont which can be used in conventional blown and cast film extrusion and coextrusion equipment designed to process polyethylene resins.

Any potassium ions can be used. Frequently used potassium ions include KOH, $KHCO_3$, $K_2CO_3$, $KHSO_4$, $KH_2PO_4$, $K_2HPO_3$, potassium stearate, potassium oleate, potassium salicylate, potassium phenolate, or combinations of two or more thereof.

The potassium ions can be present in the composition in an amount that is capable of reducing the tendency to build up static charge of an article such as a film comprising or produced from the ionomer. For example, the amount can be about 0.01 to about 5, 0.1 to about 5, or about 0.5 to about 4, or about 1 to about 3, % of the weight of the ionomer. The tendency to build up static charge by the composition may be substantially reduced to a level that, as measured by static decay times and the ash test without being in the regime of dissipative or antistat polymers, and still maintain the physical properties of the ionomer. For example, the tendency to build up static charge of the invention composition can be substantially the same as a polyethylene, which has surface conductivities of about $10^{12}$ Ohms/square or higher.

The composition can further comprise one or more monobasic, dibasic, or polybasic carboxylic acids having fewer than 36 carbon atoms, or salts thereof. The acids can be present in the composition from about 1 to about 50 weight %. Examples of such organic acids include caproic acid, caprylic acid, capric acid, lauric acid, stearic acid, isostearic acid, behenic acid, erucic acid, oleic acid, and linoleic acid. Naturally derived organic fatty acids such as palmitic, stearic, oleic, erucic, behenic acids, or combinations of two or more thereof. Saturated organic acids, such as stearic acid and behenic acid, may reduce organoleptic properties of the composition.

Acids substituted with substituents including $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is independently H or $C_1$-$C_8$ alkyl with at least one $C_{1-8}$ alkyl group are branched acids. Saturated, linear organic acids include behenic acid.

If the composition comprises one or more organic acids disclosed above, greater than 70%, 80% or 90% (or even 100%) of acidic groups in the ionomer and organic acids can be neutralized with metal ions and the metal ions present in the mixture can comprise at least 50 mole % Na or K ions and the preponderance of the other metal ions are alkali metal ions.

Alternatively, a composition having the property of reducing static charges can be made by directly neutralizing an acid copolymer with both Na ions (or Zn ions or Mg ions or combinations of two or more thereof and K ions; blending Na-ionomer with K-ionomer; or contacting K-ions to a Na-ionomer or contacting Na ions to a K-ionomer. The Na-ionomer can also be Zn-ionomer or Mg-ionomer (or combinations of two or more of the three) wherein the final concentration of the potassium ions can be the same as disclosed above.

The amount of K ions is also the amount that does not decrease or substantially decrease the ionomer's properties of heat seal, hot tack, tensile, impact toughness, or other properties for packaging applications. Such amount can also reduce the cake mix collected on a film comprising or produced from a sodium- or zinc-neutralized ionomer.

The composition can be produced by any means known to one skilled in the art such as, for example, mixing the K ions that can be in a liquid or an aqueous solution with a sodium- or zinc-neutralized ionomer; or mixing a potassium ionomer with a sodium, zinc or magnesium ionomer. Mixing can be carried out by means known in the art. One method is to mix the components in a compounding extruder. Another is to mix ionomers in an extruder with an appropriate mixing screw in-line while making film, sheet or other articles.

A process for reducing the tendency of an ionomer to buildup static charge comprises contacting an ionomer disclosed above with potassium ions, which can be in a liquid or an aqueous solution and the quantity of the potassium ions can be the same as that disclosed above.

Alternatively, the process for reducing the tendency of an ionomer to buildup static charge can comprise neutralizing an acid copolymer with both Na ions (or Zn ions or Mg ions or combinations of two or more thereof) and K ions; contacting Na-ionomer with K-ionomer; or contacting K-ions to a Na-ionomer. The Na-ionomer can also be Zn-ionomer or Mg-ionomer (or combinations of two or more of the three) wherein the final concentration of the potassium ions can be the same as disclosed above.

An article such as a film (including multilayer film or sheet) having reduced or substantially reduced static charge buildup can be produced from the composition. The article can be used for packaging as disclosed below.

A multilayer structure may comprise at least one layer comprising the composition disclosed herein and at least one layer comprising or produced from any other polymer such as the well known polyolefin, polyamide, polyester, ethylene alkyl(meth)acrylate copolymer, ethylene acid copolymer, vinyl acetate copolymer, polyvinyl alcohol, polyvinylidene chloride, or combinations of two or more thereof. A multilayer film can include up to 10 or more layers.

Appropriate amounts of various additives can be present in the composition and/or the film. Additives can include plasticizers, stabilizers such as hydrolytic stabilizers, radiation stabilizers, thermal stabilizers, ultraviolet light stabilizers, antioxidants, ultraviolet ray absorbers, colorants, dyes or pigments, delustrants such as $TiO_2$, fillers, fire-retardants, lubricants, reinforcing agents such as glass fiber and flakes, processing aids such as antiblock agents, release agents, anti-slip agents, slip agents such as talc, anti-block agents, other processing aids, elastomers, or mixtures thereof.

A film (including multilayer film) can be made from the composition by melt-processing using known processes such as co-extrusion, sheet extrusion, extrusion casting, extrusion coating, thermal lamination, blown film methods, powder coating and sintering, or like processes. The film can be further processed into articles disclosed below with uniaxial or biaxial stretching, axial heat sealing, thermoforming, vacuum forming, sheet folding, heat sealing, compression molding, or combinations of two or more thereof.

A film including multilayer film can also be sealed to itself to form a container or package, optionally including a sealant such as ethylene polymer including low density polyethylene, linear low density polyethylene, and metallocene polyethylene; ethylene vinyl acetate copolymer, ethylene alkyl(meth)acrylate copolymer; ethylene acid copolymer or an ionomer therefrom, polyester, polyamide, or combinations of two or more thereof A film or multilayer film or sheet comprises or derived from the composition can be formed into a shaped article such as a tray, cup, bottle, cap, lid, blister pack, any container, flooring materials, or combinations of two or more thereof that can be ideal packaging for cosmetics, powder food medicine, beverage, juice, milk, meats, cheese, fish, poultry, nuts, coffee, sauce, stews, dried fruit, food paste, soups or soup concentrate spice, condiment, personal care product (toothpaste, shaving foam, soap, shampoo, lotion), fragrances, electronic component, chemical (fragrant laundry detergent, fragrant fabric softener), or combinations of two or more thereof.

Because the processes for making films and the shaped articles are well known to one skilled in the art, the description of which is omitted herein for the interest of brevity.

Shaped articles such as tray, cup, bottle, cap, lid, blister pack, container, cosmetics case, housing or other parts of household appliances (e.g., handle for electric iron and housing for hair dryer, vacuum cleaner, kitchen appliance, and telephone), or combinations of two or more thereof can be produced from a composition disclosed above by virtually any method of extrusion processing or thermoforming known to those skilled in this art. A melt extrusion process such as injection molding, compression molding, blow molding and profile extrusion can be used. As such, the articles can be injection molded, compression molded, blow molded, or profile extruded. The shaped articles may comprise layers of polymers other than the composition disclosed herein. A film or sheet (or even a blow molded article such as bottle), the layers can be made by coextrusion or lamination). In an injection molded part, there can be co-injection molding, which is similar to coextrusion, or overmolding. The film or sheet or blow molded article can comprises a layer comprising the composition as a distinct layer and other optional layer(s) comprising other polymers.

EXAMPLES

The examples are provided to illustrate, but is not to be construed to unduly limit the scope of, the invention.

2-mil films of an ethylene acid copolymer (Nucrel® 0903 (9 wt % methacrylic acid or MAA) from DuPont), and two ionomers (a Surlyn®-Na ionomer (a sodium ionomer with about 10% acid and 55% neutralized with sodium salts) and a Surlyn® zinc ionomer) were made on a laboratory blown film line equipped with a ¾-inch (1.905 cm) diameter extruder and 1-inch (2.54 cm) diameter die (see description below).

Surface resistivity of the films made from the acid copolymer, and two ionomers were measured by following ASTM D257. All films had about the same resistivity of about $2.5 \times 10^{16}$ Ohms/sq. The films were then loaded with a charge and static decay time was measured. The films did not decay in a time frame that could be measured. Static decay times were then measured with films made from blends of K-ionomer and Na-ionomer. Further testing consisted of rubbing films and conducting an ash test, where the charged films are held close to a pile of cake mix and the amount of powder collected onto the film was measured.

In Table 1, films were made from compositions comprising (1) 100% MK400 potassium ionomer (available as Entira™ AS MK400 from DuPont), (2) blend 1 included 40% MK400 and 60% Surlyn®-Na ionomer, and (3) blend 2 included 60% MK400 potassium ionomer and 40% Surlyn®-Na ionomer. The blends were made in-line while making the films (pellet blended, fed to the extruder and relying on the mixing screw to complete the blending process.)

2-mil (0.05 mm) blown film samples were made on a Brabender 0.75 inch (1.905 cm) extruder with 1 inch (2.54 cm) die and a single stage mixing screw to test static decay properties. The films were 3.25 inch×5 inch (8.26 cm×12.7 cm). An Elecro-Tech Systems model 406C was used for measuring the time for a charged voltage of 5 DC Kilovolts (5 kV) to decay, following Federal Test Method 101, Method 4046.

For the first set of measurements the films were equilibrated at each test environment for approximately 30 minutes. The static decay times of the films are shown below. A-10% decay is the time for the charge to reach 10% of its original value, not the time to decay by 10%.

TABLE 1

| | Static Decay Time | | | |
| --- | --- | --- | --- | --- |
| | 21° C. and 50% relative humidity | | 21° C. and 15% relative humidity | |
| Film Specimen | 50% decay (sec) | 10% decay (sec) | 50% decay (sec) | 10% decay (sec) |
| MK400 | 0.01 or less | 0.01 or less | 0.01 or less | 0.01 or less |
| Blend 1 | 1.4 | 135 | 6 s to reach 2 kv* | |
| Blend 2 | 0.01 or less | 0.01 or less | 0.08 | 12.6 |

*The charge on this sample decayed to 2 kv and then held constant.

The films were then measured at 15% relative humidity after equilibrating for 24 hours. The two blends didn't take a charge of 5 kv and the MK400 took on average 50 seconds to reach 5 kv charge and an average of 10.8 seconds to reach 50% decay.

A second set of tests was carried out where the films were equilibrated at the given relative humidity for 24 hours before measuring, as shown in Table 2 below.

TABLE 2

Static Decay Time (seconds)[A]

| Film | 23° C. 30.5% RH | | 23° C., 48.8% RH | | 23° C., 70.2% RH | |
|---|---|---|---|---|---|---|
| Decay | 50% | 10% | 50% | 10% | 50% | 10% |
| Blend 3 | 1.75 kv max. | 1.75 kv max. | 1.5 kv max. | 1.5 kv max. | 0.11 | 1.54 |
| Blend 4 | 1.75 kv max. | 1.75 kv max. | 0.23 | 7.47 | 0.01 | 0.01 |
| Blend 5 | 10.6* | 139* | 0.01 | 0.02 | 0.01 | 0.01 |
| Sample 6 | 0.00 | 0.01 | 0.01 | 0.01 | 0.01 | 0.01 |

[A]Blend 3, 20% MK400 and 80% Surlyn ® sodium ionomer;
Blend 4, 40% MK400 and 60% Surlyn ® sodium ionomer;
Blend 5, 60% MK400 and 40% Surlyn ® sodium ionomer;
and Sample 6, 100% MK400.
*Required 1.5 minutes to reach +5 DC kv For those values listed as 1.5 or 1.75 kv max, the films did not hold a charge of 5 kv (as specified by the measurement protocol) and we did not measure the decay.

The following films, all prepared on a Brabender blown film extruder as disclosed above with the exception of the DuPont DPE 1645 PE (polyethylene) film which was cast on a 28 mm twin screw extruder with a 10 inch (25.4 cm) coat hanger die were measured for static buildup. The films were 3.25 inch×5 inch (8.26 cm×12.7 cm) and approximately 2 mils (0.05 mm) in thickness. The test involved inducing a static charge on the film by rubbing a cotton cloth against the film with ten forward and backward strokes and then placing it in direct contact with Betty Crocker Super Moist vanilla cake mix purchased in a local grocery store. They were then weighed to determine the amount of cake mix build-up on the film.

The testing conditions were at 69.4° F. (20.8° C.) and 31.7% relative humidity. Results shown in Table 3 were the average of three specimens per sample.

TABLE 3*

| Specimen Tested | Average gain (g) | Standard Dev. |
|---|---|---|
| 100% DuPont DPE 1645 | 0.15 | 0.03 |
| Sample 7 | 0.21 | 0.02 |
| Blend 8 | 0 | 0 |
| Blend 9 | 0.14 | 0.008 |
| Blend 10 | 0.05 | 0.01 |
| Blend 11 | 0.0008 | 0.0001 |

*DuPont DPE 1645 is LDPE (low density polyethylene);
Sample 7, 100% Surlyn ® sodium ionomer;
Sample 8, 100% MK400;
Blend 9, 20% MK400 and 80% Surlyn ®-Na ionomer;
Blend 10, 40% MK400 and 60% Surlyn ® ionomer;
and Blend 11, 60% MK400 and 40% Surlyn ®-Na ionomer.

Samples shown in Table 4 were films produced on a Brabender blown film extruder as discussed above and tested using the cake mix test described for Table 3. The testing conditions were 72.8° F. and 57.5% relative humidity.

TABLE 4

| Example | Specimen Tested | Avg gain (g) | Std. Dev. |
|---|---|---|---|
| LDPE control | 100% DPE 1645 PE | 0.09 | 0.02 |
| Sample 12 | 100% MK400 K-ionomer | 0 | 0 |
| Sample 13 | 100% Surlyn ®-Na 1 | 0.08 | 0.02 |
| Blend 14 | 20% MK400/80% Surlyn ®-Na 1 | 0.06 | 0.001 |
| Blend 15 | 40% MK400/60% Surlyn ®-Na 1 | 0.006 | 0.003 |
| Blend 16 | 60% MK400/40% Surlyn ®-Na 1 | 0 | 0 |
| Sample 17 | 100% Surlyn ®-Na 2 | 0.06 | 0.004 |
| Blend 18 | 20% MK400/80% Surlyn ®-Na 2 | 0.07 | 0.002 |
| Blend 19 | 40% MK400/60% Surlyn ®-Na 2 | 0.05 | 0.01 |
| Blend 20 | 60% MK400/40% Surlyn ®-Na 2 | 0.03 | 0.01 |
| Sample 21 | 100% Surlyn ®Zn 1 | 0.19 | 0.03 |
| Blend 22 | 20% MK400/80% Surlyn ®-Zn 1 | 0.14 | 0.02 |
| Blend 23 | 40% MK400/60% Surlyn ®-Zn 1 | 0.11 | 0.02 |
| Blend 24 | 60% MK400/40% Surlyn ®-Zn 1 | 0.09 | 0.006 |
| Sample 25 | 100% Surlyn ®-Zn 2 | 0.1 | 0.006 |
| Blend 26 | 20% MK400/80% Surlyn ®-Zn 2 | 0.07 | 0.009 |
| Blend 27 | 40% MK400/60% Surlyn ®-Zn 2 | 0.06 | 0.009 |
| Blend 28 | 60% MK400/40% Surlyn ®-Zn 2 | 0.05 | 0.002 |

Surlyn ®-Na 1 is a sodium ionomer with about 10% acid and 55% neutralized with sodium salts,
Surlyn ®-Na 2 is a sodium ionomer with about 15% acid and 50% neutralized with sodium salts,
Surlyn ®-Zn 1 is zinc ionomer with about 9% acid and 20% neutralized with zinc salts, and
Surlyn ®-Zn 2 is a zinc ionomer with about 15% acid and 50% neutralized with zinc salts.

Table 5 shows three ionomers prepared by neutralizing 80% of the acid groups of a nominal 15% acid copolymer by adding NaOH and $K_2CO_3$ in an extruder with sufficient mixing, residence time and temperature to complete the neutralization reaction. Films were produced from these ionomers on a Brabender blown film extruder as discussed above and tested using the cake mix test described for Table 3. The testing conditions were 73° F. and 26% relative humidity.

TABLE 5

| Example | Specimen Tested | Avg gain (g) | Std. Dev. |
|---|---|---|---|
| LDPE control | DuPont DPE 1640 | 0.09 | 0.03 |
| Sample 29 | E/15% MAA-80% Neutralized; 75:25 K to Na | 0 | 0 |
| Sample 30 | E/15% MAA-80% Neutralized; 50:50 K to Na | 0.0014 | 0.0005 |
| Sample 31 | E/15% MAA-80% Neutralized; 25:75 K to Na | 0.0016 | 0.0002 |
| Blend 32 | 20% MK400/80% Surlyn ®-Na 1 | 0.21 | 0.001 |
| Blend 33 | 40% MK400/60% Surlyn ®-Na 1 | 0.16 | 0.02 |

The static charge during film fabrication was measured using a Pro Stat Electrostatic Fieldmeter Model PFM 711A. The meter was mounted 2-inches from the film surface (unless otherwise noted) about 5-inches ahead of the film wind-up on the Brabender blown film line described earlier. Processing conditions and the measured static charge are given in Table 6 below in which "Neu" denotes neutralization or neutralized.

Films of 2-mils in thickness were made from the resins in shown in Table 8 on a MPM Blown Film line. Heat seal strength of the films sealed to themselves was measured on a Precision Bar heat sealer Packaging Industries at 1-s dwell and 4 lb per $in^2$ of seal jaw pressure. The seal jaw width was 1 inch. Both jaws were heated to the given jaw temperature. Actual temperature at the film interface was measured using a 5 mil chromel-alumel thermocouple. Results of heat seal

TABLE 6

| Example | Sample 34 | Sample 35 | Sample 36 | Blend 37 | Blend 38 | Control |
|---|---|---|---|---|---|---|
| Sample ID | E/15% MAA, 80% Neut, 75:25 K:Na | E/15% MAA, 80% Neu, 50:50 K:Na | E/15% MAA, 80% Neu, 25:75 K:Na | 40% MK 400/60% Surlyn ® Na 1 | 20% MK 400/80% Surlyn ® Na 1 | DPE 1640 LDPE |
| Heat Zone (° C.) | | | | | | |
| 1 | 179 | 180 | 180 | 180 | 180 | 180 |
| 2 | 205 | 205 | 205 | 205 | 205 | 205 |
| 3 | 210 | 210 | 210 | 210 | 210 | 210 |
| 4 | 210 | 210 | 210 | 210 | 210 | 210 |
| Melt Temp (° C.) | 218 | 218 | 219 | 219 | 221 | 219 |
| Extruder Volts | 55 | 60 | 60 | 60 | 60 | 57 |
| Extruder Amps | 3 | 3.2 | 3.4 | 2.9 | 2.9 | 1.8 |
| Extruder screw speed, rpm | 32 | 34 | 34 | 34 | 34 | 34 |
| Extruder exit pressure, psi | 510 | 600 | 680 | 640 | 620 | 310 |
| Air Ring Air Speed | maximum | maximum | maximum | maximum | maximum | 8 |
| Takeoff Speed, rpm | 100 | 100 | 100 | 100 | 100 | 102 |
| Takeoff Speed, ft/min | 6.5 | 6.5 | 6.5 | 6.5 | 6.5 | 6.5 |
| Static Charge kv/in. | −2.2 to −3.0 | −14 to −18 | −16 to −30 | −26 to −38 | −30 to −48* | −6.0 to −7.0 |

*Measured at 3-inches from film surface instead of 2-inches.

Four ionomers shown in Table 7 were prepared by neutralizing 55% of the acid groups of a nominal 10% acid copolymer by adding NaOH, $K_2CO_3$ or both in an extruder with sufficient mixing, residence time and temperature to complete the neutralization reaction. These have similar acid level and % neutralization as the Surlyn® Na 1 ionomer. The physical properties are compared in Table 7 below in which the melt index (MI) was measured according to ASTM D1238, 190° C./2.16 Kg; Vicat was measured according to ASTM D1525; freezing and melting points were measured according to ASTM D3418 (DSC); the Instron was used to measure tensile properties according to ASTM D638 (elongation at break, yield strength and tensile strength) and D790 (flex modulus); and Tabor was a well known abrasion test.

measurements are given in the table below where "peel" refers to a clean failure between the two film surfaces and "tear" indicates that the seal strength was sufficiently strong so that the films tore while they were being pulled apart. In the former the peel strength was less than the tear strength, in the latter the peel strength exceeded the tear strength and the films tore in failure.

TABLE 8

| Sample | Heat Seal Jaw Temp (C.) | Interface (C.) | Seal Strength, g/in | Comments |
|---|---|---|---|---|
| 39 | 80 | 76.9 | 9 | peel |
| 39 | 100 | 94.6 | 1249 | tear |

TABLE 7

| Composition | Method | Sample 39 E/10% MAA, 55% Neu | Sample 40 E/10% MAA, 55% Neu | Sample 41 E/10% MAA, 55% Neu | Sample 42 E/10% MAA, 55% Neu |
|---|---|---|---|---|---|
| Ratio of K:Na ions | Mass balance | 0:100 | 25:75 | 50:50 | 75:25 |
| MI (g/10 min) | | 0.98 | 1.36 | 0.87 | 1.06 |
| Freezing Point (C.) | DSC | 58.94 | 59.30 | 57.48 | 58.92 |
| Melting Point (C.) | DSC | 96.62 | 95.53 | 96.10 | 95.52 |
| Flex Modulus (PSI) | Instron | 28790 +/− 433 | 27232 +/− 448 | 26198 +/− 772 | 30323 +/− 3648 |
| Yield Strength (PSI) | Instron | 1814 +/− 40 | 1813 +/− 18 | 1855 +/− 26 | 1796 +/− 42 |
| Break Elongation (%) | Instron | 406 +/− 34 | 426 +/− 3 | 395 +/− 21 | 432 +/− 9 |
| Tensile Strength (PSI) | Instron | 4054 +/− 280 | 4224 +/− 44 | 3967 +/− 170 | 3987 +/− 95 |
| Softening Point | Vicat | 71.7 | 71.6 | 71.2 | 72.2 |
| Abrasion | Tabor | 0.1891 | 0.2074 | 0.1950 | 0.1732 |
| Abrasion % wt. Loss | | 0.78 | 0.85 | 0.77 | 0.71 |

TABLE 8-continued

| Sample | Heat Seal Jaw Temp (C.) | Interface (C.) | Seal Strength, g/in | Comments |
|---|---|---|---|---|
| 39 | 120 | 111 | 1930 | tear |
| 39 | 140 | 131.5 | 2020 | tear |
| 39 | 160 | 152.3 | 2170 | tear |
| 39 | 180 | 170.9 | 1848 | tear |
| 39 | 200 | 187.4 | 2111 | tear |
| 40 | 80 | 78.7 | 36 | peel |
| 40 | 100 | 93.6 | 1371 | tear |
| 40 | 120 | 112.2 | 1303 | tear |
| 40 | 140 | 131.2 | 1589 | tear |
| 40 | 160 | 152.8 | 1566 | tear |
| 40 | 180 | 170.6 | 1975 | tear |
| 40 | 200 | 188.5 | 2138 | tear |
| 41 | 80 | 74 | 36 | peel |
| 41 | 100 | 94.7 | 1330 | tear |
| 41 | 120 | 11.3 | 1194 | tear |
| 41 | 140 | 131.7 | 1757 | tear |
| 41 | 160 | 151.9 | 1961 | tear |
| 41 | 180 | 170.5 | 2120 | tear |
| 41 | 200 | 187.5 | 1898 | tear |
| 42 | 80 | 74.2 | 41 | peel |
| 42 | 100 | 95.2 | 1357 | tear |
| 42 | 120 | 113.5 | 1462 | tear |
| 42 | 140 | 133.2 | 1389 | tear |
| 42 | 160 | 152.4 | 1662 | tear |
| 42 | 180 | 170.1 | 1807 | tear |
| 42 | 200 | 188.5 | 1666 | tear |

Three ionomers were prepared by neutralizing 80% of the acid groups of a nominal 10% acid copolymer by adding NaOH, potassium $K_2CO_3$ or both in an extruder with sufficient mixing, residence time and temperature to complete the neutralization reaction. The physical properties are compared in Table 9 below where the melt index, freezing point and melting point were measure as in Table 8.

TABLE 9

|  | Sample 43 | Sample 44 | Sample 45 |
|---|---|---|---|
| Composition | E/10% MAA, 80% Neu | E/10% MAA, 80% Neu | E/10% MAA, 80% Neu |
| Ratio of K:Na ions | 0:100 | 50:50 | 100:0 |
| MI (g/10 min) | 3.30 | 2.18 | 0.67 |
| Freezing Point (C.) | 55.00 | 53.13 | 52.18 |
| Melting Point (C.) | 93.17 | 92.67 | 90.75 |
| Flex Modulus (PSI) | 28692 +/− 316 | 24479 +/− 626 | 17222 +/− 280 |
| Yield Strength (PSI) | 1893 +/− 34 | 1899 +/− 53 | 1631 +/− 64 |
| Break Elongation (%) | 308 +/− 18 | 311 +/− 7 | 257 +/− 25 |
| Tensile Strength (PSI) | 3349 +/− 115 | 3480 +/− 54 | 2547 +/− 154 |
| Softening Point | 66.2 | 64.6 | 60.7 |
| Abrasion | 0.3125 | 0.4479 | 0.4674 |
| Abrasion % wt. Loss | 1.27 | 1.73 | 1.83 |
| Shore D | 60 | 60 | 54 |
| Haze | 0.4 | 0.5 | 0.8 |
| Gloss 20 | 89.9 | 109.1 | 80.1 |
| Gloss 60 | 138.1 | 140.8 | 132.5 |
| Tear (MD) | 12.31 | 15.00 | 6.15 |
| Tear (TD) | 13.91 | 10.32 | 13.33 |

Films of 2-mils thickness were made from the resins in samples 43-45 in the same way as for samples 39-42. Heat seal strength of the films sealed to themselves was measured as described above as given in Table 10.

TABLE 10

| Sample | Heat Seal Jaw Temp (° C.) | Interface (° C.) | Seal Strength (g/in) | Comments |
|---|---|---|---|---|
| 43 | 80 | 78.1 | 5 | peal |
| 43 | 100 | 95.3 | 64 | peal |
| 43 | 120 | 114.4 | 931 | tear |
| 43 | 140 | 132.2 | 1044 | tear |
| 43 | 160 | 151.6 | 1112 | tear |
| 43 | 180 | 170 | 1353 | tear |
| 44 | 80 | 78 | 5 | peal |
| 44 | 100 | 94.7 | 209 | peal |
| 44 | 120 | 112.2 | 1003 | tear |
| 44 | 140 | 132.8 | 1598 | tear |
| 44 | 160 | 151.8 | 1557 | tear |
| 44 | 180 | 170.9 | 1130 | tear |
| 45 | 80 | 77.9 | 45 | peal |
| 45 | 100 | 96 | 490 | peal |
| 45 | 120 | 113.2 | 1235 | tear |
| 45 | 140 | 133.3 | 1071 | tear |
| 45 | 160 | 152.1 | 1444 | tear |
| 45 | 180 | 171 | 976 | tear |

The invention claimed is:

1. A composition comprising an ionomer and potassium ion, wherein the potassium ion is present in an effective amount to reduce static charge buildup of the composition; and the ionomer has its carboxylic acid or a portion thereof in its corresponding acid copolymer neutralized with a metal ion selected from the group consisting of sodium ions, zinc ions, magnesium ions, and combinations of two of more thereof.

2. The composition of claim 1 wherein about 1 to about 70% of the carboxylic acid is neutralized with sodium ions, zinc ions, magnesium ions, or combinations of two or more thereof and the potassium ion is in the form selected from the group consisting of KOH, $KHCO_3$, $K_2CO_3$, $KHSO_4$, $KH_2PO_4$, $K_2HPO_3$, potassium stearate, potassium oleate, potassium salicylate, potassium phenolate, and combinations of two or more thereof.

3. The composition of claim 2 wherein the ionomer comprises an ethylene acid copolymer and the potassium ion is in the form of $KHCO_3$ or $K_2CO_3$.

4. The composition of claim 3 wherein the ethylene acid copolymer comprises repeat units derived from ethylene and about 1 to about 50 weight % of acrylic acid, methacrylic acid, ethacrylic acid, and combinations of two or more thereof, based on the total weight of the ethylene copolymer and up to 35 weight % of a comonomer selected from the group consisting of carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, and combinations of two or more thereof.

5. The composition of claim 2 wherein the potassium ion is present in the range of about 0.01 to about 5% of the weight of the ionomer.

6. The composition of claim 3 wherein the potassium ion is present in the range of about 0.1 to about 5% of the weight of the ionomer.

7. The composition of claim 4 wherein the potassium ion is present in the range of 1 to about 3% of the weight of the ionomer.

8. The composition of claim 5 wherein the ionomer comprises an acid copolymer comprising repeat units derived from ethylene, an acrylic acid or methacrylic acid, and up to 35 weight % of a comonomer selected from the group consisting of carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, and combinations of two or more thereof.

9. The composition of claim 7 wherein the ionomer comprises or an acid copolymer comprising repeat units derived from ethylene, an acrylic acid or methacrylic acid, and up to 35 weight % of a comonomer selected from the group consisting of carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, and combinations of two or more thereof.

10. The composition of claim 8 further comprising one or more carboxylic acids having fewer than 36 carbon atoms, or salts thereof.

11. The composition of claim 10 wherein the acid is selected from the group consisting of caproic acid, caprylic acid, capric acid, lauric acid, stearic acid, isostearic acid, behenic acid, erucic acid, oleic acid, linoleic acid, and combinations of two or more thereof.

12. The composition of claim 9 further comprises behenic acid.

13. The composition of claim 11 wherein greater than 80% of acid groups in the composition are neutralized with a metal ion.

14. The composition of claim 13 wherein 100% of acid groups in the composition are neutralized.

15. A process comprising contacting an ionomer with potassium ions to produce an antistatic composition wherein the ionomer is as recited in claim 1 and the potassium ion is present in an amount effective to reduce any static charge buildup of the composition.

16. An article comprising the composition as recited in claim 1, wherein the article is selected from the group consisting of a film, a sheet, a multilayer film, a multilayer sheet, or shaped article; the shaped article is selected from the group consisting of a tray, a cup, a bottle, a cap, a lid, a blister pack, a container, a flooring material, and combinations of two or more thereof.

17. The article of claim 16 wherein the article is the shaped article.

18. The article of claim 17 wherein the article is selected from the group consisting of cosmetics, powder food medicine, beverage, juice, milk, meats, cheese, fish, poultry, nuts, coffee, sauce, stews, dried fruit, food paste, soups, soup concentrate, spice, condiment, personal care product, fragrances, electronic component, chemical, and combinations of two or more thereof.

19. The article of claim 16 wherein the article includes injection molded articles is selected from the group consisting of tray, cup, bottle, cap, lid, blister pack, container, cosmetics case, housing or other parts of household appliances, and combinations of two or more thereof.

20. The article of claim 16 wherein the article is the film, the sheet, the multilayer film, or the multilayer sheet.

* * * * *

UNITED STATES PATENT AND TRADEMARK OFFICE
CERTIFICATE OF CORRECTION

| | | |
|---|---|---|
| PATENT NO. | : 7,825,191 B2 | Page 1 of 1 |
| APPLICATION NO. | : 11/642072 | |
| DATED | : November 2, 2010 | |
| INVENTOR(S) | : Barry Alan Morris et al. | |

It is certified that error appears in the above-identified patent and that said Letters Patent is hereby corrected as shown below:

Please correct the Claims as follows:

Claim 9, line 2, delete "or" before the words "an acid"

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,825,191 B2
APPLICATION NO. : 11/642072
DATED : November 2, 2010
INVENTOR(S) : Barry Alan Morris et al.

It is certified that error appears in the above-identified patent and that said Letters Patent is hereby corrected as shown below:

Please correct the Claims as follows:

Claim 9, Column 14, line 2, delete "or" before the words "an acid"

This certificate supersedes the Certificate of Correction issued March 8, 2011.

Signed and Sealed this
Twenty-ninth Day of March, 2011

David J. Kappos
*Director of the United States Patent and Trademark Office*